(12) United States Patent
Brahmadesam et al.

(10) Patent No.: US 11,461,192 B1
(45) Date of Patent: Oct. 4, 2022

(54) AUTOMATIC RECOVERY FROM DETECTED DATA ERRORS IN DATABASE SYSTEMS

(71) Applicant: Amazon Technologies, Inc., Seattle, WA (US)

(72) Inventors: Murali Brahmadesam, Woodinville, WA (US); Navaneetha Krishnan Thanka Nadar, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 16/698,760

(22) Filed: Nov. 27, 2019

(51) Int. Cl.
*G06F 11/14* (2006.01)
*G06F 16/27* (2019.01)

(52) U.S. Cl.
CPC ...... *G06F 11/1469* (2013.01); *G06F 11/1451* (2013.01); *G06F 16/275* (2019.01); *G06F 2201/80* (2013.01); *G06F 2201/82* (2013.01)

(58) Field of Classification Search
CPC .. G06F 11/14; G06F 11/1469; G06F 11/1451; G06F 2201/82; G06F 2201/80
See application file for complete search history.

(56) References Cited

U.S. PATENT DOCUMENTS

| | | | | |
|---|---|---|---|---|
| 5,835,915 A * | 11/1998 | Carr | .................... | G06F 11/2066 714/38.14 |
| 6,163,856 A * | 12/2000 | Dion | .................... | G06F 11/2064 709/213 |
| 6,226,651 B1 * | 5/2001 | Masuda | ............... | G06F 11/1471 |
| 6,983,295 B1 * | 1/2006 | Hart | ..................... | G06F 11/1469 707/610 |
| 7,210,060 B2 * | 4/2007 | Chai | .................... | G06F 11/1469 714/6.3 |
| 7,668,846 B1 * | 2/2010 | Ghemawat | .......... | G06F 11/1662 707/648 |
| 7,668,876 B1 * | 2/2010 | Kulkarni | ................. | G06F 16/10 707/674 |
| 8,838,539 B1 * | 9/2014 | Ashcraft | ............. | H04L 49/9005 707/637 |
| 8,903,779 B1 * | 12/2014 | Holenstein | .......... | G06F 11/1469 707/685 |
| 8,924,347 B1 * | 12/2014 | Kasera | .................... | G06F 16/27 707/615 |

(Continued)

*Primary Examiner* — Kamini B Patel
(74) *Attorney, Agent, or Firm* — Robert C. Kowert; Kowert, Hood, Munyon, Rankin & Goetzel, P.C.

(57) ABSTRACT

Systems and methods are disclosed to implement an automatic recovery technique for a detected corruption of stored data in a database system. In embodiments, the database system implements a physical replication process that replicates the contents of a primary volume to a mirror volume, with a specified mirror lag. The database system also stores a log of updates that it has received. The database system is configured to detect an error caused by a recent write operation received during the mirror lag. Upon detection, physical replication to the mirror volume is stopped, and a logical replication is performed where write operations logged during the mirror lag are replayed on the mirror volume. The mirror volume is then promoted to replace the primary volume in the database system. Advantageously, the disclosed recovery technique can be performed very quickly, and with zero loss of client requests received before initiation of the recovery.

20 Claims, 9 Drawing Sheets

(56) References Cited

U.S. PATENT DOCUMENTS

| | | | | |
|---|---|---|---|---|
| 9,002,793 B1* | 4/2015 | Ashcraft | ............. | G06F 12/0806 |
| | | | | 707/636 |
| 9,361,348 B1* | 6/2016 | Ashcraft | ................ | G06F 16/27 |
| 10,007,715 B1* | 6/2018 | Ashcraft | ............. | H04L 49/9005 |
| 10,635,691 B1* | 4/2020 | Ashcraft | ................ | H04L 67/02 |
| 11,288,112 B1* | 3/2022 | Shankar | ............. | G06F 11/0727 |
| 2008/0178050 A1* | 7/2008 | Kern | ................... | G06F 11/1666 |
| | | | | 714/E11.02 |
| 2009/0049329 A1* | 2/2009 | Lind | ................... | G06F 11/2097 |
| | | | | 714/2 |
| 2009/0287967 A1* | 11/2009 | Winokur | ............. | G06F 11/2082 |
| | | | | 714/54 |
| 2012/0054533 A1* | 3/2012 | Shi | ...................... | G06F 11/2097 |
| | | | | 714/4.1 |
| 2015/0019485 A1* | 1/2015 | Amdur | ................... | G06F 16/27 |
| | | | | 707/639 |
| 2016/0179637 A1* | 6/2016 | Winokur | ............. | G06F 11/2005 |
| | | | | 714/5.1 |
| 2016/0179867 A1* | 6/2016 | Li | ........................... | G06F 3/065 |
| | | | | 707/634 |
| 2018/0074915 A1* | 3/2018 | Yang | .................. | G06F 11/2028 |

* cited by examiner

AUTOMATIC RECOVERY FROM DETECTED DATA ERRORS IN DATABASE SYSTEMS

BACKGROUND

Database systems have historically been among the components of the software stack that are least amenable to distribution. In particular, it can be difficult to distribute databases while still ensuring the so-called ACID properties (e.g., Atomicity, Consistency, Isolation, and Durability) that they are expected to provide. While most existing relational databases are not distributed, some existing databases are "scaled out" (as opposed to being "scaled up" by merely employing a larger monolithic system) using one of two common models: a "shared nothing" model, and a "shared disk" model. In general, in a "shared nothing" model, received queries are decomposed into database shards (each of which includes a component of the query), these shards are sent to different compute nodes for query processing, and the results are collected and aggregated before they are returned. In general, in a "shared disk" model, every compute node in a cluster has access to the same underlying data. In systems that employ this model, great care must be taken to manage cache coherency. In both of these models, a large, monolithic database is replicated on multiple nodes (including all of the functionality of a stand-alone database instance), and "glue" logic is added to stitch them together. For example, in the "shared nothing" model, the glue logic may provide the functionality of a dispatcher that subdivides queries, sends them to multiple compute nodes, and then combines the results. In a "shared disk" model, the glue logic may serve to fuse together the caches of multiple nodes (e.g., to manage coherency at the caching layer). These "shared nothing" and "shared disk" database systems can be costly to deploy, complex to maintain, and may over-serve many database use cases.

Different database systems may provide high availability configurations where failure of one component in the system will cause the system to switch to a second redundant component to allow the system to continue operating. However, these high availability solutions do not generally protect against data errors at the storage layer. Data corruptions at the storage layer may not be immediately detectable in many database systems. When such data errors are eventually detected, a proper restoration of the data is often time consuming and labor intensive, typically requiring the database system to be closed to client requests and causing some amount of previously received client updates to be lost. Better mechanisms are needed to protect against these types of data errors in the storage system.

Figure 1:
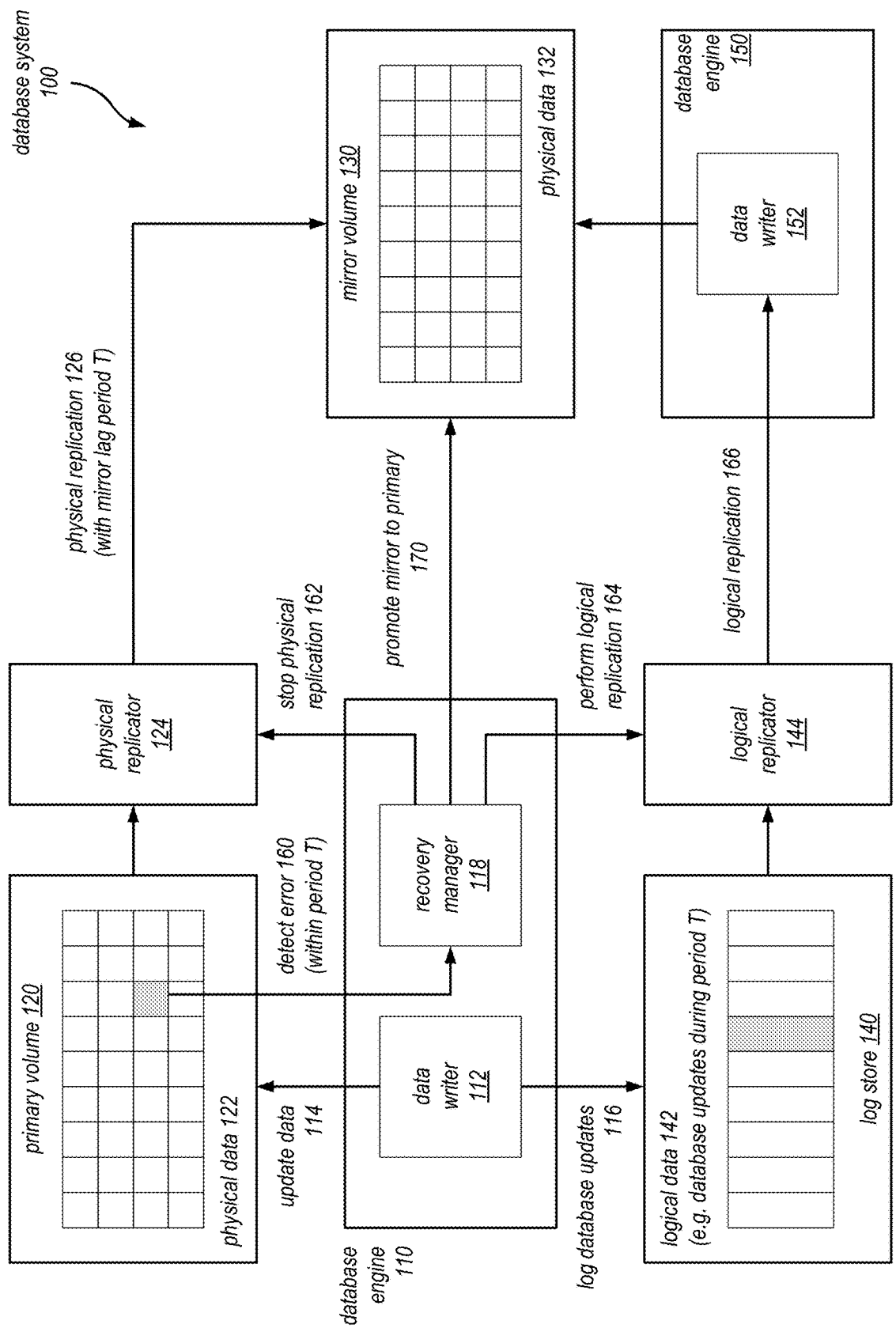
FIG. 1 is a block diagram illustrating an example database system that implements an automatic recovery from detected data errors using physical and logical replication, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Systems and methods described herein may be employed in various combinations and in embodiments to implement a database system that provides automatic recovery from detected data errors in the storage system using physical and logical replication, according to some embodiments.

Database systems may provide different mechanisms to protect against the failure of system component. For example, some database systems may operate in a highly available configuration where failure of one component in the system causes the system to switch to a redundant component to allow the system to continue operating. Some database systems may take further measures to ensure system availability, by isolating redundant components into distinct resource groups that do not fail together. Moreover, many database systems implement some degree of data protection by continuously backing up its data to create a series of data restoration points.

However, these measures do not fully address all challenges in protecting the database system from data errors at the storage layer. For one thing, data corruptions at the storage layer are often not detected in a timely fashion. Thus, the underlying error condition may persist in the system to potentially cause additional damage to the data. When such data errors are eventually detected, a proper restoration of the data can be time consuming and labor intensive, typically requiring the database system to be closed to client requests. Worse, in some cases, the restoration may not be complete, resulting in some amount of previously received client updates to be lost. Additionally, traditional backup-and-restore type solutions require the database system to maintain large amounts of backup data, which limits the scalability of the database system and increases the total cost of ownership of these systems.

Accordingly, to address these and other problems with conventional database systems, embodiments of an automatic recovery technique is disclosed to recover database systems from data errors detected at the storage layer.

In embodiments of the recovery technique, two data stores (e.g. a primary volume and a mirror volume) are maintained for a database. The mirror volume may be configured to replicate the primary volume. For example, the primary volume may store data pages or blocks of a database, and the pages or blocks may be periodically copied to the mirror volume. In some embodiments, delayed mirroring or replication is performed from the primary volume to the mirror volume with a specified mirror lag. This mirror lag may be configured so that detection of any data errors in the primary volume will occur within the lag period, so that the database system can stop the replication in time to prevent the error to be propagated from the primary volume to the mirror volume. In some embodiments, the two volumes may be maintained at the same geographic region.

In some embodiments, the database system may implement a logical data store that is separate from the physical data in the primary volume. The logical data store may be a log store that stores logged update operations that have been generated or received by the database system. In some embodiments, the logical data store may store enough logical data to catch up the mirror volume (e.g. via a logical replication process) to an expected state of the database during the recovery process. For example, the logical data store may be configured to retain all operations generated or received during the mirror lag period between the primary volume and the mirror volume. By storing the logical data separately from the physical data, the database system increases the likelihood that the logical data is both available and correct despite a failure of the primary volume.

In some embodiments, the database system is implemented with a detection mechanism to detect errors in the physical data (e.g. in the primary volume) in a time-bound detection process. In some embodiments, detection of a data error will always occur within the mirror lag period. In this manner, replication to the mirror volume can be stopped in time to prevent the error from being propagated to the mirror volume. The detection may be performed at the database engine, the storage layer, or a combination of both. In some embodiments, the time-bound detection may be implemented by the storage layer to generate a new page image in the primary volume within a specified period of time. That new page image is then compared to a corresponding page image generated by the database engine. The data error is detected when a mismatch of the two page images is detected.

In some embodiments, once a data error in the primary volume is detected, the database system will automatically perform a recovery process to catch up the mirror volume to a state of the database expected by clients, and to fail over to the mirror volume. During the recovery process, the mirror volume may be detached from the primary volume, so that the ongoing physical replication process is stopped. As discussed, the stopping of the physical replication process is performed within the mirror lag period, so as to prevent the detected error from being propagated to the mirror. Then, the logical data (e.g. logged update operations in the log store) may be applied (e.g. replayed) to the mirror volume. This replaying of the logical data will produce the correct physical data in the mirror volume, correcting the error that was detected in the primary volume. In some embodiments, this replaying of the logical data may be performed by a different instance of the database engine than the database engine that produced the error in the primary volume. Finally, the database system may promote the caught-up mirror volume to be the new primary volume, so that all subsequent data updates are performed directly on the mirror volume.

As may be appreciated by those skilled in the art, the automatic recovery technique disclosed herein improves the functioning of database systems of the state of the art to provide at least some of the following technical benefits. In one respect, the recovery process can be performed extremely quickly. At any given time, the state of the mirror volume is kept close to the state of the primary volume using the physical replication process, and the catchup process (e.g. the logical replication process) only requires the replaying of a small number of updates on the mirror. In some embodiments, the entire recovery process may be performed in just a few seconds, and the failover to the mirror volume may occur while the database remains online and continues to receive client requests.

In another respect, the disclosed recovery technique requires only a small amount of restore data to be maintained. In some embodiments, the restore data may only include the mirror volume and a small amount of logged update operations for the mirror lag period. The modest data requirement for the restoration distinguishes the disclosed recovery technique from most traditional point-in-time restoration approaches, which typically requires a large amount of restore data (e.g. snapshots) to be maintained. Moreover, because the disclosed recovery technique can be used to protect against data errors (and not just physical equipment failures), in some embodiments, the primary volume and the mirror volume may be kept in close proximity (e.g. at the same physical location), which allows the mirror volume to be implemented with an extremely small mirror lag.

In another respect, because the detection of data error occurs very quickly (e.g. in a time-bound fashion), the initial data corruption can be corrected immediately, avoiding extensive damage to the data. Moreover, this fast detection of data errors means that most detected errors will be relatively minor, and recovery process can be relatively fast and straightforward. In some embodiments, the recovery process can be achieved with zero data loss. That is, the client can expect to achieve a "recovery point objective" (RPO) of zero, meaning that the client will recover all updates submitted to the database prior to the recovery process.

In yet another respect, in the event that a failure occurs in the logical data store (e.g. if some of the logged update operations are corrupted), the database system can quickly and transparently recover from this failure, by simply restarting or rebuilding the logical data from subsequent update operations. Because the amount of logical data needed for recovery is small, the occasional rebuilding of the logical data will not present any significant risk to the overall recovery process. In some embodiments, the logical data may be implemented using native logging capabilities of the database system. These and other features and benefits of the automatic recovery technique are described in further detail below, in connection with the figures.

FIG. 1 is a block diagram illustrating an example database system that implements an automatic recovery from detected data errors using physical and logical replication, according to some embodiments.

As shown, in some embodiments, the database system 100 may implement the automatic recovery technique using a primary volume 120 and a mirror volume 130. As shown, the system includes a physical replicator 124 that provides ongoing physical replication 126 to the mirror volume 130. In some embodiments, the mirror volume 130 may be implemented as a read-only volume. In some embodiments, the mirror volume 130 may be configured to replicate only a portion of the data held in the primary volume 120.

The physical data in the two volumes (e.g. physical data 122 and 132) may be maintained in any suitable form usable by the database system (e.g. the database engines 110 and 150). In some embodiments, the physical data may be stored as individual data pages, blocks, or other types of storage locations that can be easily searched or fetched by the database engine 110 and 150. In some embodiments, the physical data may be maintained as one or more files on top of file system. In some embodiments, the data may be stored in a hierarchical form, in a key-value form, or any other suitable form.

As shown in this example, the recovery process is coordinated by a recovery manager 118 implemented by an instance of the database engine 110. In other embodiments, the recovery manager 118 may be implemented at least in part on other components of the database system, such as components in the storage or replication subsystems. The database engine 110 may be implemented by a database server, which may be a physical machine or a hosted virtual machine. In some embodiments, multiple database engine instance can exist on the same server, for example, as different processes or groups of processes. In some embodiments, a database engine instance may be provided in a database service that employs a serverless architecture, where database engine nodes can be automatically started up, shut down, or otherwise managed by the database service.

As shown, the database engine 110 in this example implements a data writer 112. The data write may be configured to issue write or update requests 114 to the primary volume 120. For example, the database engine 110 may convert client database requests to individual page updates requests, and send the page update requests to the primary volume 120.

Additionally, in this example, the data writer 112 may also log database updates 116 to a log store 140. In this example, the logged database updates 116 represents the log data 142 that is kept for the automatic recovery process. However, in some embodiments, other types of logical data 142 may be used. For example, in some embodiments, the logical data 142 may include log entries that represent individual page or block updates. In some embodiments, the logical data 142 may be processed database statements submitted by the clients. In some embodiments, the logical data may store other types of indications for updates performed on the physical data 122, in a form other than in log data form. In some embodiments, the updating of the primary volume 120 and the logging of database updates 116 may be performed by two different components in the database engine 110, in two completely asynchronous processes.

As shown, in this example, the log store 140 is a separate storage from the primary volume 120. This separation is provided so that the physical data 122 and the logical data 124 do not depend on the same underlying storage components, so that data error(s) seen in one type of data is not likely accompanied by data error(s) seen in the other type of data. In some embodiments, the two different types of data may be stored on separate storage media (e.g. separate physical storage). In some embodiments, separation may be implemented at a high level, for example, by separating the controllers or storage nodes that perform the updates to the data.

As shown, the database system 100 may implement a physical replicator 124 that is configured to perform physical replication 126 of the physical data 122 in the primary volume 120 to the physical data 132 in the mirror volume 130. In some embodiments, this physical replication 126 may involve copying physical pages or blocks in the physical data 122 to corresponding pages or blocks in the physical data 132. The copying may be performed in sequential order of the updates 114. In some embodiments, instead of copying, the two volumes 120 and 130 may simply be written at the same time. For example, in some embodiments, the data writer 112 may perform the physical replication 126 to the mirror volume 130. In some embodiments, the volumes 120 and 130 may reside at the same physical location, for example, a single local area network, building, data center, or room. In some embodiments, the two volumes 120 and 130 may be different disks in a redundant array of inexpensive disks (RAID) storage system, and the data writer 112 or physical replicator 124 may be implemented by a controller of the RAID storage system.

As shown in this example, the physical replication 126 is performed to implement a mirror lag period T. The mirror lag may be deliberately configured to provide the database system enough time to detect errors in the primary volume 120. For example, the mirror lag may be manually configured via a configuration interface or based on known data about how long it takes for an error to be detected in the primary volume. As discussed, once an error is detected, the physical replication 126 will be stopped so that the error will not be replicated to the mirror volume 130. In some embodiments, the mirror lag may be specified as a time period (e.g. one minute). In some embodiments, the mirror lag may be specified in terms of a quantity of physical data updates. For example, in an embodiment where the physical replication 126 is sent to the mirror volume in batches, the mirror lag may be specified to be some number of such batches.

As shown in this example, the database engine 110 implements a recovery manager 118. As discussed, in other embodiments, the recovery manager 118 or portions of the recovery manager 118 may be implemented in other components. As shown, the recovery manager 118 is configured to detect 160, within the mirror lag time T, an error in the physical data 122. The error (e.g. a corrupted page or block) is shown in this example as the colored box in the physical data 122. In some cases, this error may be introduced by the database engine 110, for example, during the operations of the data writer 112. In some embodiments, the error may be caused by the storage system (e.g. a component of a subsystem that implements the primary volume 120).

In this example, the error in the physical data 122 was caused by a particular database update shown as another colored box in the logical data 142. As shown, in some embodiments, only a small amount of logical data 142 may be maintain (here only those database updates performed during the mirror lag period T). This is because only this amount of logical data is needed to perform the automatic recovery process. However, in some embodiments, more logical data may be kept. For example, in some embodiments, the database system 100 may keep all log entries produced by ongoing logging process (e.g. for a write ahead log). In such embodiments, the logical data 142 may be a subset of the larger log, which is determined during the recovery process.

Depending on the embodiment, the detection 160 of the data error may be accomplished in a variety of ways. In some embodiments, the database system may force the primary volume 160 to produce a page or block image within the mirror lag period T. The database system (e.g. the recovery manager 118) may then compare the page or block image generated in the primary volume with another page or block image (e.g. one generated by the database engine itself in its own cache memory). The comparison may be performed using respective checksum or hashes of the two images. If the comparison determines that the two images are a mismatch, this may be considered a data error in the primary volume requiring a recovery. In some embodiments, the detection of errors may be performed by other components, for example, by the storage subsystem or the replicator subsystem of the database system.

In some embodiments, once the error is detected by the recovery manager 118, the recovery manager will initiate the recovery process. In some embodiments, the recovery process will stop 162 the physical replication process, perform 164 the logical replication process 166 by replaying the logged database updates in the logical data on the mirror volume, and then promote the mirror volume to become the new primary volume. In some embodiments, this recovery process may be performed very quickly, in a matter of seconds. In some embodiments, the recovery process may be performed with zero loss of client updates made prior to the recovery. In some embodiments, the recovery process may be performed while the database remains online to continue accepting client requests.

In some embodiments, the stopping 162 of the physical replication 126 is made during the mirror lag time T, so that the detected error is not propagated to the mirror volume 130. After the physical replication is stopped, the recovery manager 118 may then instruct a logical replicator component 144 to perform the logical replication process 166. In some embodiments, the logical replication process may be performed by causing another database engine 150 to replay the logged database updates onto the mirror volume 130. In some embodiments, the logical replicator 144 may be a separate component (e.g. separate process or server) from the database engine instance 150. In some embodiments, the logical replicator may be implemented as part of the database engine 150. In some embodiments, the logical replicator may be implemented as part of the recovery manager 118 or the first database engine instance 110. However, by using a separate database engine instance 150 to perform the replay, the database system avoids the reproduction of errors that were possibly caused by the first database engine instance 110.

In some embodiments, after the mirror volume 130 has been caught up (e.g. received all database updates in the logical data 142), the mirror volume will be in a state of the database as expected by clients of the database. Because the state was produced by replaying, using a separate database engine instance, the last database updates that caused the error in the primary volume, the mirror volume will not have the same error as seen in the primary volume. At this point, the recovery manager 118 may cause the mirror volume to be promoted 170 to become the new primary volume. Thereafter, all database updates will be submitted directly to the new primary volume. In some embodiments, a new mirror volume will be automatically created to start mirror the new primary volume to enable a next recovery.

In some embodiments, the automatically recovery process described above may be provided as a feature of the database system, which can be enabled, disabled, and/or configured via a configuration interface of the database system or recovery manager. In some embodiments, the configuration interface may be a web-based or graphical user interface (GUI), and may allow users to specify operational settings of the recovery process. In some embodiments, the configuration interface may be provided as a programmatic interface that can be invoked by other computer systems, such as an application programming interface (API) or a service interface. In various embodiments, the configuration interface may allow users to specify settings such as the mirror lag period, the location of the mirror volume and recovery database engine 150, the type of errors to trigger the recovery process, among other configurable parameters. In some embodiments, the mirror volume 130 may be created in response to configuration input to enable the automatic recovery process.

Figure 2:
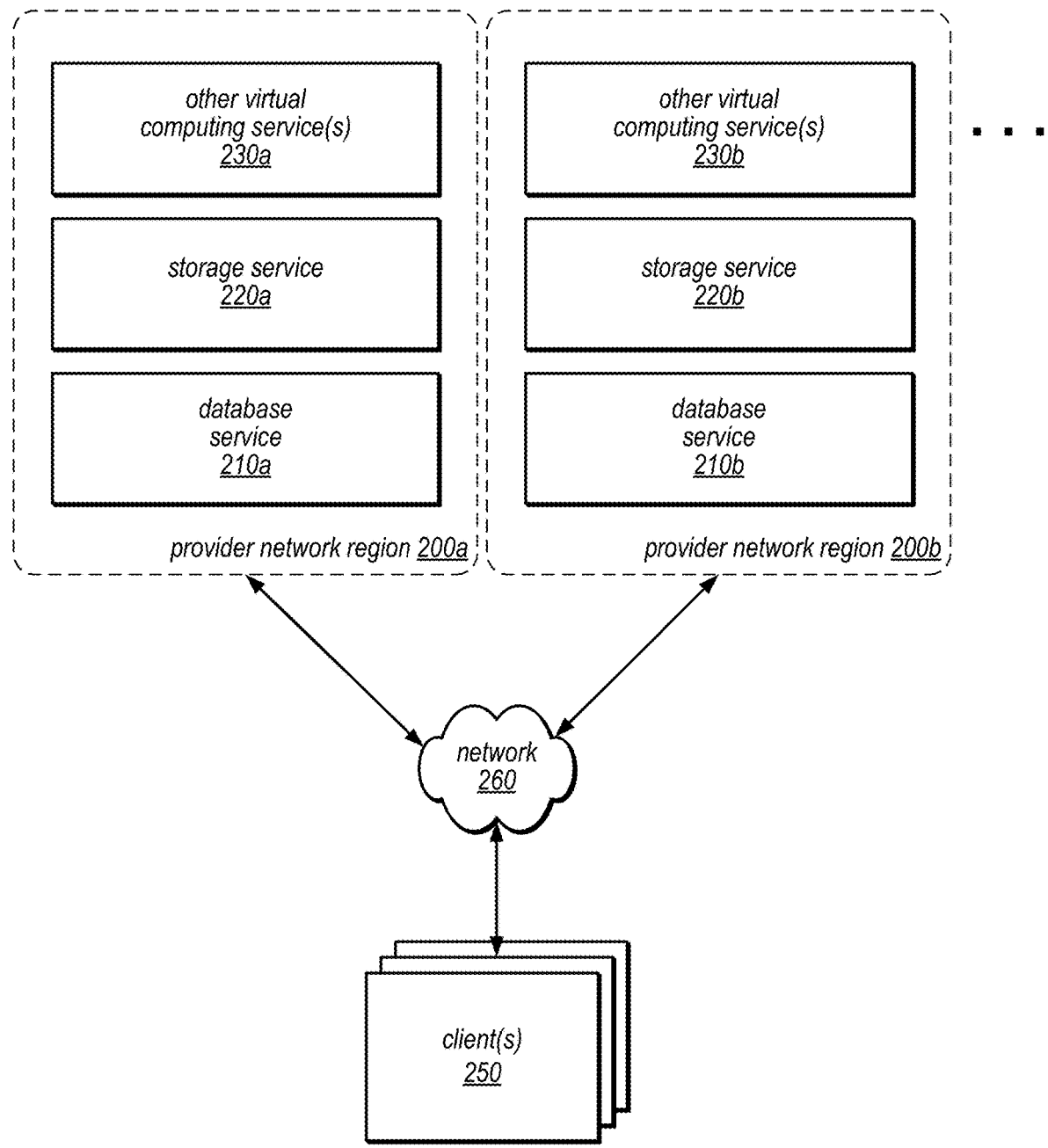
FIG. 2 is a block diagram illustrating a database service in multiple provider network regions that can implement automatic recovery from detected data errors using physical and logical replication, according to some embodiments.

FIG. 2 is a block diagram illustrating a database service in multiple provider network regions that can implement automatic recovery from detected data errors using physical and logical replication, according to some embodiments.

In some embodiments, a provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, such as provider network regions 200a, 200b, and so on, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network regions 200. Provider network regions 200 may, in some embodiments, be isolated from other provider network regions. In the illustrated embodiment, a number of clients (shown as clients 250 may interact with a provider network region 200 via a network 260. Provider network regions 200 may implement respective instantiations of the same (or different) services, a database services 210a and 210b, a storage services 220a and 220b and/or one or more other virtual computing services 230a and 230b. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network region 200 may be coordinated by client 250 and the operating system or file system on behalf of applications executing within the operating system environment.

Clients 250 may convey network-based services requests to and receive responses from provider network region 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network region 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network region 200 using a private network rather than the public Internet. For example, clients 250 may be provisioned within the same enterprise as a database service system (e.g., a system that implements database service 210 and/or storage service 220). In such a case, clients 250 may communicate with platform 200 entirely through a private network 260 (e.g., a LAN or WAN that may use Internet-based communication protocols but which is not publicly accessible).

Generally speaking, provider network region 200 may implement one or more service endpoints may receive and process network-based services requests, such as requests to access data pages (or records thereof). For example, provider network region 200 may include hardware and/or software may implement a particular endpoint, such that an HTTP-based network-based services request directed to that endpoint is properly received and processed. In one embodiment, provider network region 200 may be implemented as a server system may receive network-based services requests from clients 250 and to forward them to components of a system that implements database service 210, storage service 220 and/or another virtual computing service 230 for processing. In other embodiments, provider network region 200 may be configured as a number of distinct systems (e.g., in a cluster topology) implementing load balancing and other request management features may dynamically manage large-scale network-based services request processing loads. In various embodiments, provider network region 200 may be may support REST-style or document-based (e.g., SOAP-based) types of network-based services requests. In some embodiments, the database system 100 of FIG. 1 may be implemented by the database service 210 shown here. In some embodiments, the primary volume 120 and mirror volume 130 of FIG. 1 may be implemented by the storage service 220 shown here.

In addition to functioning as an addressable endpoint for clients' network-based services requests, in some embodiments, provider network region 200 may implement various client management features. For example, provider network region 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network region 200 may also implement financial accounting and billing systems, or may maintain a database of usage data that may be queried and processed by external systems for reporting and billing of client usage activity. In certain embodiments, provider network region 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another virtual computing service 230 (or the underlying systems that implement those services).

In some embodiments, provider network region 200 may also implement user authentication and access control procedures. For example, for a given network-based services request to access a particular database table, provider network region 200 ascertain whether the client 250 associated with the request is authorized to access the particular database table. Provider network region 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region 200 to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region 200 may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
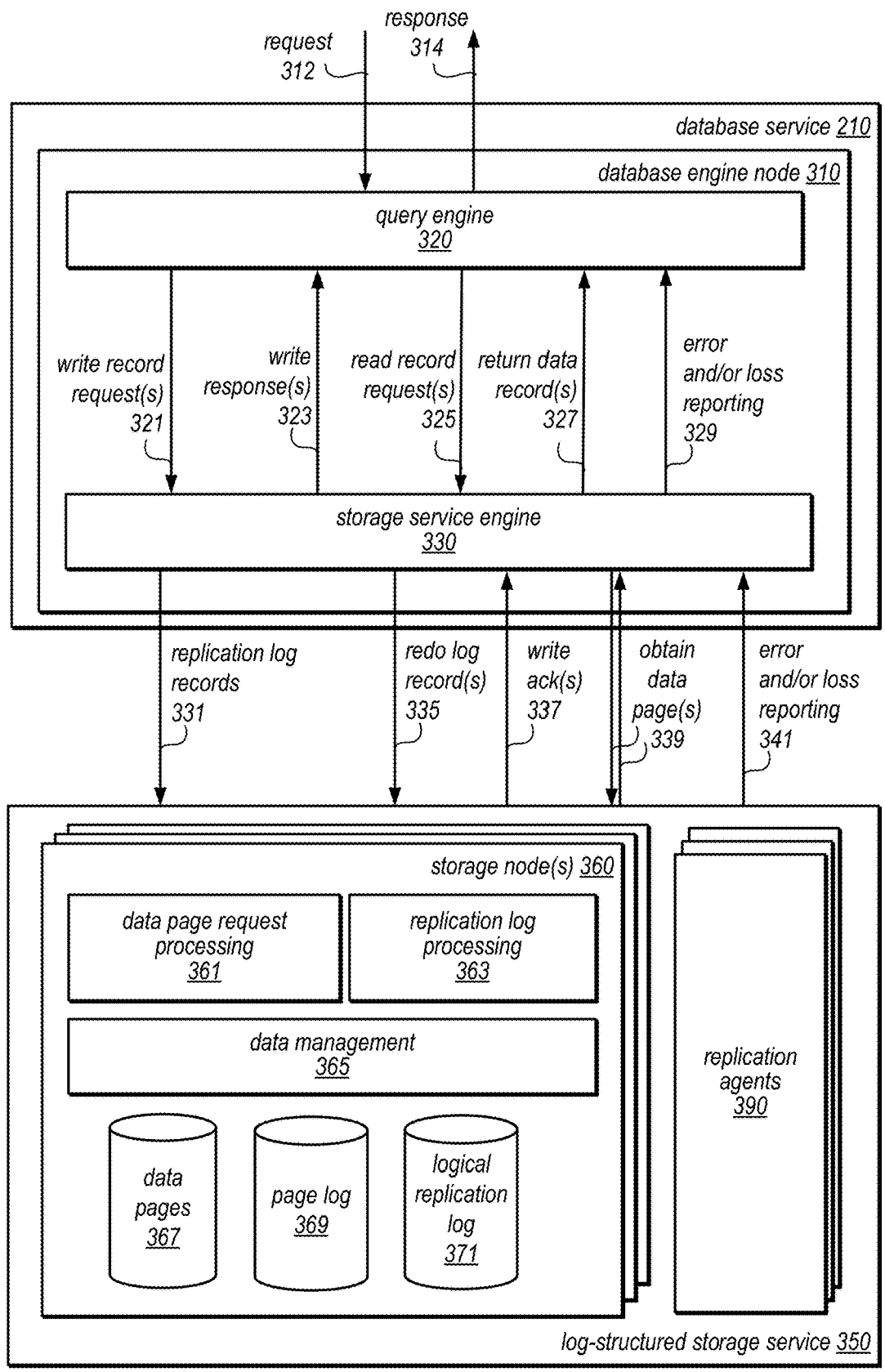
FIG. 3 is a block diagram illustrating components of a database service and storage service that may be used to implement automatic recovery from detected data errors using physical and logical replication, according to some embodiments.

FIG. 3 is a block diagram illustrating components of a database service and storage service that may be used to implement automatic recovery from detected data errors using physical and logical replication, according to some embodiments.

For example, in the example database system implemented as part of database service 210, a database engine head node 310 may be implemented for each of several databases and a log-structured storage service 350 (which may or may not be visible to the clients of the database system). Clients of a database may access a database engine node 310 (which may be implemented in or representative of a database instance) via network utilizing various database access protocols (e.g., Java Database Connectivity (JDBC) or Open Database Connectivity (ODBC)). However, log-structured storage service 350, which may be employed by the database system to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, log-structured storage service 350 may perform various storage, access, change logging, recovery, log record manipulation, and/or space management operations in a manner that is invisible to clients of a database engine node 310. In some embodiments, the database engines 110 and 150 of FIG. 1 may be implemented by difference instances of the database engine node 310.

In some embodiments, a database instance may include a single database engine node 310 that implements a query engine 320 that receives requests, like request 312, which may include queries or other requests such as updates, deletions, etc., from various client programs (e.g., applications) and/or subscribers (users), then parses them, optimizes them, and develops a plan to carry out the associated database operation(s). Query engine 320 may return a response 314 to the request (e.g., results to a query) to a database client, which may include write acknowledgements, requested data pages (or portions thereof), error messages, and or other responses, as appropriate. As illustrated in this example, database engine node 310 may also include a storage service engine 330 (or client-side driver), which may route read requests and/or redo log records to various storage nodes within log-structured storage service 350, receive write acknowledgements from log-structured storage service 350, receive requested data pages from log-structured storage service 350, and/or return data pages, error messages, or other responses to query engine 320 (which may, in turn, return them to a database client). In some embodiments, the log-structed storage service 350 may be configured to primary volume 120 and mirror volume 130 of FIG. 1.

In this example, query engine 320 or another database system management component implemented at database engine node 310 (not illustrated) may manage a data page cache, in which data pages that were recently accessed may be temporarily held. Query engine 320 may be responsible for providing transactions and consistency in the database instance of which database engine node 310 is a component. For example, this component may be responsible for ensuring the Atomicity, Consistency, and Isolation properties of the database instance and the transactions that are directed that the database instance, such as determining a consistent view of the database applicable for a query, applying undo log records to generate prior versions of tuples of a database. Query engine 320 may manage an undo log to track the status of various transactions and roll back any locally cached results of transactions that do not commit.

FIG. 3 illustrates various interactions to perform various requests, like request 312. For example, a request 312 that includes a request to write to a page may be parsed and optimized to generate one or more write record requests 321, which may be sent to storage service engine 330 for subsequent routing to log-structured storage service 350. In this example, storage service engine 330 may generate one or more redo log records 335 corresponding to each write record request 321, and may send them to specific ones of the storage nodes 360 of log-structured storage service 350. Log-structured storage service 350 may return a corresponding write acknowledgement 337 for each redo log record 335 (or batch of redo log records) to database engine node 310 (specifically to storage service engine 330). Storage service engine 330 may pass these write acknowledgements to query engine 320 (as write responses 323), which may then send corresponding responses (e.g., write acknowledgements) to one or more clients as a response 314.

In another example, a request that is a query may cause data pages to be read and returned to query engine 320 for evaluation and processing or a request to perform query processing at log-structured storage service 350 may be performed. For example, a query could cause one or more read record requests 325, which may be sent to storage service engine 330 for subsequent routing to log-structured storage service 350. In this example, storage service engine 330 may send these requests to specific ones of the storage nodes 360 of log-structured storage service 350, and log-structured storage service 350 may return the requested data pages 339 to database engine node 310 (specifically to storage service engine 330). Storage service engine 330 may send the returned data pages to query engine 320 as return data records 327, and query engine may then evaluate the content of the data pages in order to determine or generate a result of a query sent as a response 314. As discussed below with regard to FIG. 4, some requests to store replication log records 331 may be performed as part of performing replication log techniques (e.g., to amortize the transmission of replication records to a replication log).

In some embodiments, various error and/or data loss messages 341 may be sent from log-structured storage service 350 to database engine node 310 (specifically to storage service engine 330). These messages may be passed from storage service engine 330 to query engine 320 as error and/or loss reporting messages 329, and then to one or more clients as a response 314.

In some embodiments, the APIs 331-341 of log-structured storage service 350 and the APIs 321-329 of storage service engine 330 may expose the functionality of the log-structured storage service 350 to database engine node 310 as if database engine node 310 were a client of log-structured storage service 350. For example, database engine node 310 (through storage service engine 330) may write redo log records or request data pages through these APIs to perform (or facilitate the performance of) various operations of the database system implemented by the combination of database engine node 310 and log-structured storage service 350 (e.g., storage, access, change logging, recovery, and/or space management operations).

Note that in various embodiments, the API calls and responses between database engine node 310 and log-structured storage service 350 (e.g., APIs 321-329) and/or the API calls and responses between storage service engine 330 and query engine 320 (e.g., APIs 331-341) in FIG. 3 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine node 310 and/or log-structured storage service 350.

In some embodiments, database data for a database of database service 210 may be organized in various logical volumes, segments, and pages for storage on one or more storage nodes 360 of log-structured storage service 350. For example, in some embodiments, each database may be represented by a logical volume, and each logical volume may be segmented over a collection of storage nodes 360. Each segment, which lives on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, the redo log may be used as the logical data 142, as discussed in connection with FIG. 1. In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number or LSN), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

As discussed above, log-structured storage service 350 may perform some database system responsibilities, such as the updating of data pages for a database, and in some instances perform some query processing on data. As illustrated in FIG. 3, storage node(s) 360 may implement data page request processing 361, replication log processing 363, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request. Replication log processing 363 may handle requests to store replication logs to transaction objects and update replication logs stored in or associated with logical replication log 371.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

In some embodiments, replication agents 390 may be implemented as part of log-structured storage service 350 or other storage service, as discussed above. In some embodiments, the replication agents 390 may be used implement the physical replicator 124 or logical replicator 144, as discussed in connection with FIG. 1. In some embodiments, log-structured storage service 350 may be multi-tenant storing data for different databases hosted on behalf of different user accounts (e.g., owned, operated, managed by different entities) by sharing resources at storage nodes, in some embodiments. Some replication agent(s) 390 may perform the below replication techniques for multiple different databases for different user accounts, in some embodiments.

Figure 4:
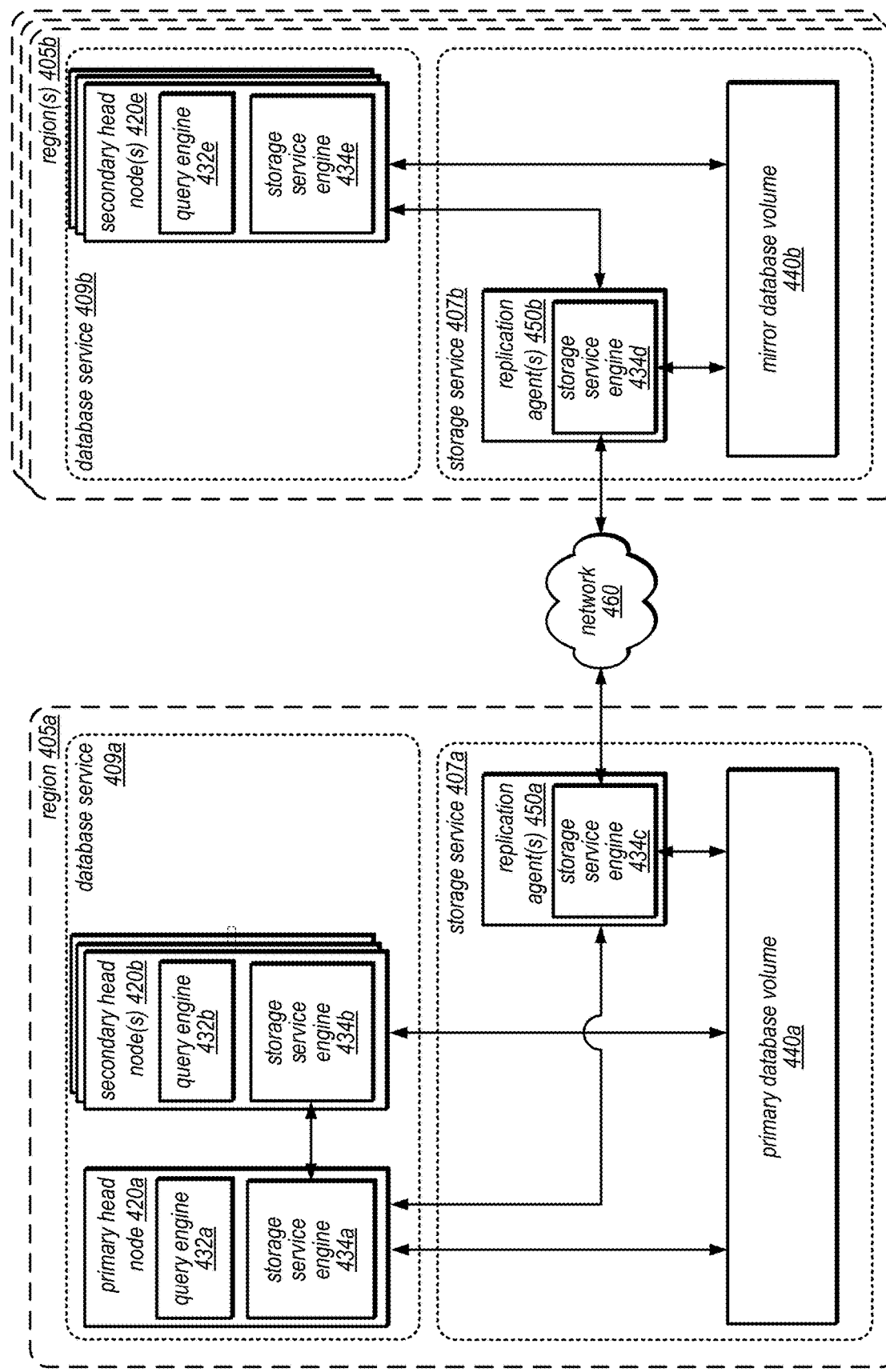
FIG. 4 is a block diagram illustrating components of a database service that may be used to implement physical replication to a mirror volume, according to some embodiments.

FIG. 4 is a block diagram illustrating components of a database service that may be used to implement physical replication to a mirror volume, according to some embodiments.

As shown, multiple clusters of one or more database engine head nodes may be hosted in respective services in database services 409a and 409b in region 405a and region(s) 405b to provides database services to clients that access the databases in the different regions. It should be noted that, while the illustrated example shows one remote cluster, any number of remote clusters may be employed. Similarly, one or multiple head nodes may be implemented within each database service for a database, in some embodiments. Multiple head nodes, as discussed above with regard to FIGS. 2 and 3, such as primary head node 420a and secondary head node(s) 420b may be implemented as part of database service 409a to provide access to a database stored in storage service 407a, in primary database volume 440a. Primary head node 420 may provide read and write capabilities to the database, utilizing database tier 432a and client-side storage service driver 434a, as well as offering additional read capacity via secondary head node(s) 420b, which includes a respective database tier 432b and client-side storage service driver 434b.

Storage service 407a may also implement a replication agent(s) 450a which may act as a reverse proxy, among other features, to replicate changes made to the database at primary database volume 440a to a mirror database volume 440b stored in storage service 407b in region 405b. Note that other regions may also implement mirror database volumes in respective storage services. In some embodiments, the primary database volume 440a and mirror database volume 440b may be used to implement the primary volume 120 and mirror volume 130, as discussed in connection with FIG. 1. Replication agent(s) 450a may implement a client-side storage service driver 434c to perform the various functionalities for replicating data from the primary database volume 440a to the mirror database volume 440b. Similarly, storage service 407b may implement replication agent(s) 450b, which may include a client-side storage service driver 434d to perform the replication techniques to the mirror database volume 440b while minimizing the time that mirror database volume is unable to be accessed by secondary head node 420e (via database tier 432e and client-side storage service driver 434e), in some embodiments. In some embodiments, multiple replication agents may be assigned to replicating changes to database copies (e.g., two replication agents for source database and database copy).

In some embodiments, client-side storage service drivers 434 may implement a one or more streams of information to assist in synchronizing updates between database volumes and head nodes. For example, client-side driver 434a may send change notifications of cache invalidation messages, and/or changes to system metadata, such as data structures that indicate the layout and/or definition of the database and/or in-flight transaction data, such as the states of and entries of active transactions at primary node 420a to client-side driver 434b of replica node 420b as well as to client-side driver 434c of replication agent 450a. Replication agent(s) 450a can function as an additional replica node of the database in database service 409a, in some embodiments. Replication agent 450a may forward the change notifications received from the client-side driver 434a to the client-side driver 434d of the replication agent 450b over a network 460 (which may be a local area network, wide area network, a public network, depending on the embodiment) where the replication agent 450b may function as single writer for mirror database volume 440b. In this way, performance of the database in database service 409a is minimally degraded yet the access to mirror database volume 440b can provide a consistent read view of the database with minimal latency, in some embodiments.

As the communications between replication agents may occur over network 460, various security protocols may be implemented. For example, SSL or other TLS security techniques may be implemented to safeguard or otherwise encrypt data being transmitted over network 460 (e.g., log records or pages transmitted as part of the replication protocol).

Figure 5:
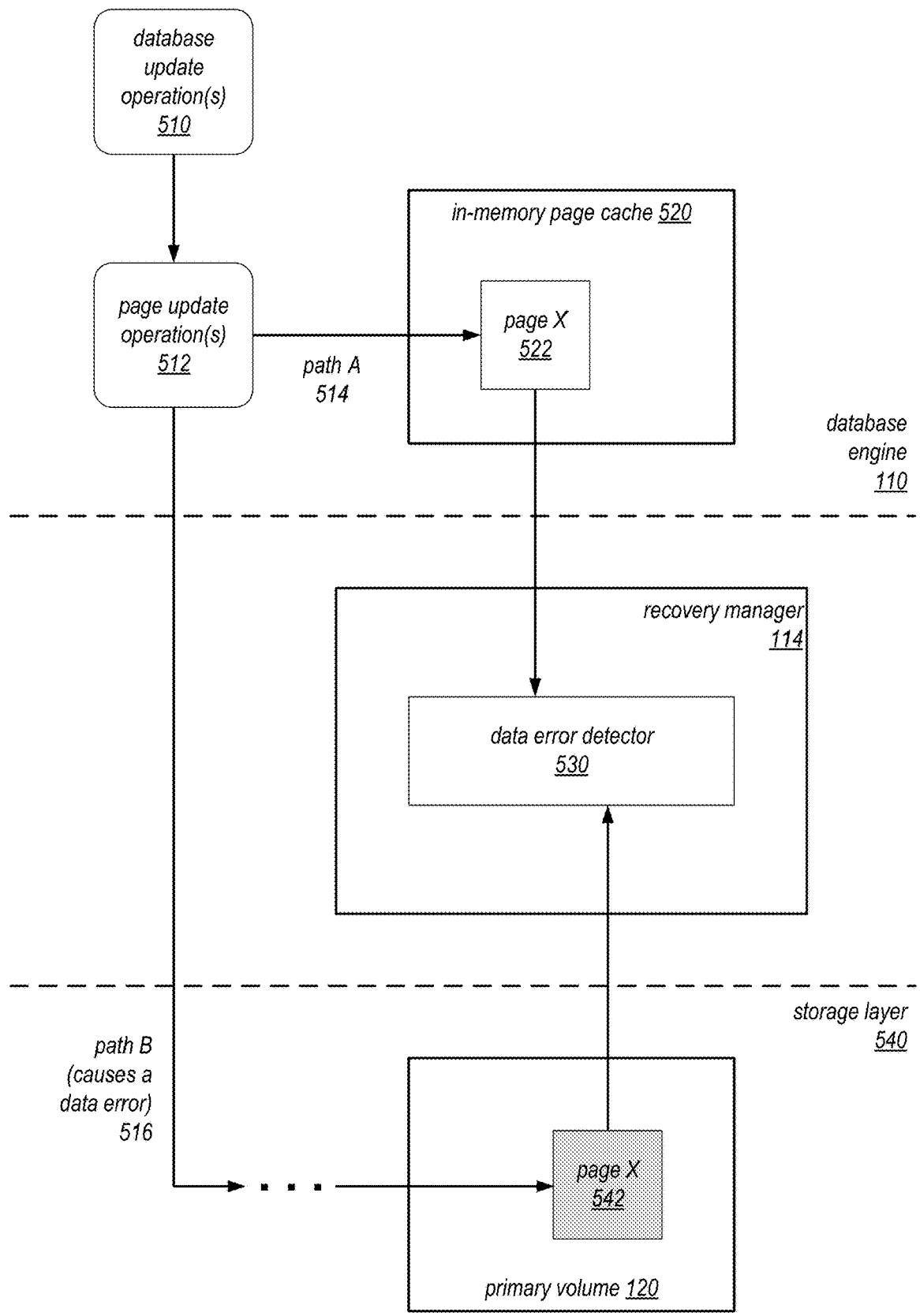
FIG. 5 illustrates an example process of detecting a data error in a storage layer of a database system, according to some embodiments.

FIG. 5 illustrates an example process of detecting a data error in a storage layer of a database system, according to some embodiments.

As shown, in this example, the database engine 110 first receives one or more database update operations 510. These database update operations 510 may be received from the clients of the database system. In some embodiments, these database update operations 510 may be logged and used as the logical data 142 of FIG. 1.

As shown, the database update operations 510 are then converted into a set of page update operations 512. This conversion may be performed within the database engine node (e.g. database engine node 310 of FIG. 3). For example, in some embodiments, the database engine may convert a update statement issued by the client into a number of page updates to a set of data pages. In some embodiments, these page update operations 512 may be logged and used as the logical data 142 of FIG. 1.

Once the update operations 512 are generated, in this example, two paths (path A 514 and path B 516) are taken to generate two different page images of a page X that is modified by the page update operations 512. As shown, path A generates an image 522 of page X in an in-memory page cache 520 of the database engine node. In some embodiments, this cache 520 may be maintained to provide faster access to a small set of pages to the database engine node. As shown, path B involves sending the page update operations 512 to the storage layer 540, when then goes through a series of steps to cause the updates to be applied to another image 542 of page X, which is stored in the primary volume 120. In some embodiments, path B may include logging the page updates in a page log (e.g. page log 369 of FIG. 3) controlled by the storage layer 540. In some embodiments, this page log may receive page updates from multiple database engine nodes. The storage layer 540 may perform conflicts on the page updates, and those updates that are deemed conflict-free are then applied to the primary volume 120.

As shown, in this example, path B 516 causes a data error. This data error may be created in a number of different ways. For example, the error may be introduced by the database engine node, which may have corrupted the page update operation or issued an incorrect page update operation. As another example, the error may be introduced as the page update is sent over the network between the database engine node and the storage layer. As another example, the error may be introduced by the storage layer, which may have mishandled the page update or corrupted the data in the primary volume 120 in some other manner. Accordingly, the storage layer image 542 of page X is incorrect. In some embodiments, in order to impose a time bound on the detection of this data error, the database system may force the storage layer 540 to create the image for any updated page within a specified time period (e.g. within the mirror lag period T discussed in connection with FIG. 1).

As shown, to detect the error, the recovery manager 118 in this example implements a data error detector 530. The detector 530 may be configured to obtain both images 522 and 542 of page X and compared the two images. The comparison may be made for example, by generating a checksum value or hash value from each of the two page images. If the two page images do not match, a data error has been detected. In some embodiments, this data error detection may be performed at the database engine node. In some embodiments, the data error detection may be performed at the storage layer. In some embodiments, the data error detection may be performed by a different component (e.g. the replication agent 450 of FIG. 4). In some embodiments, the data error detector 530 may check all updated pages in the described fashion. In some embodiments, the detector 530 may check only a subset of randomly selected pages. In some embodiments, the aspects of the data error detector 530 may be configurable via a configuration interface of the database system or recovery manager 118. As discussed, a detected data error may trigger the automatic recovery process to replace the primary volume with the mirror volume.

Figure 6:
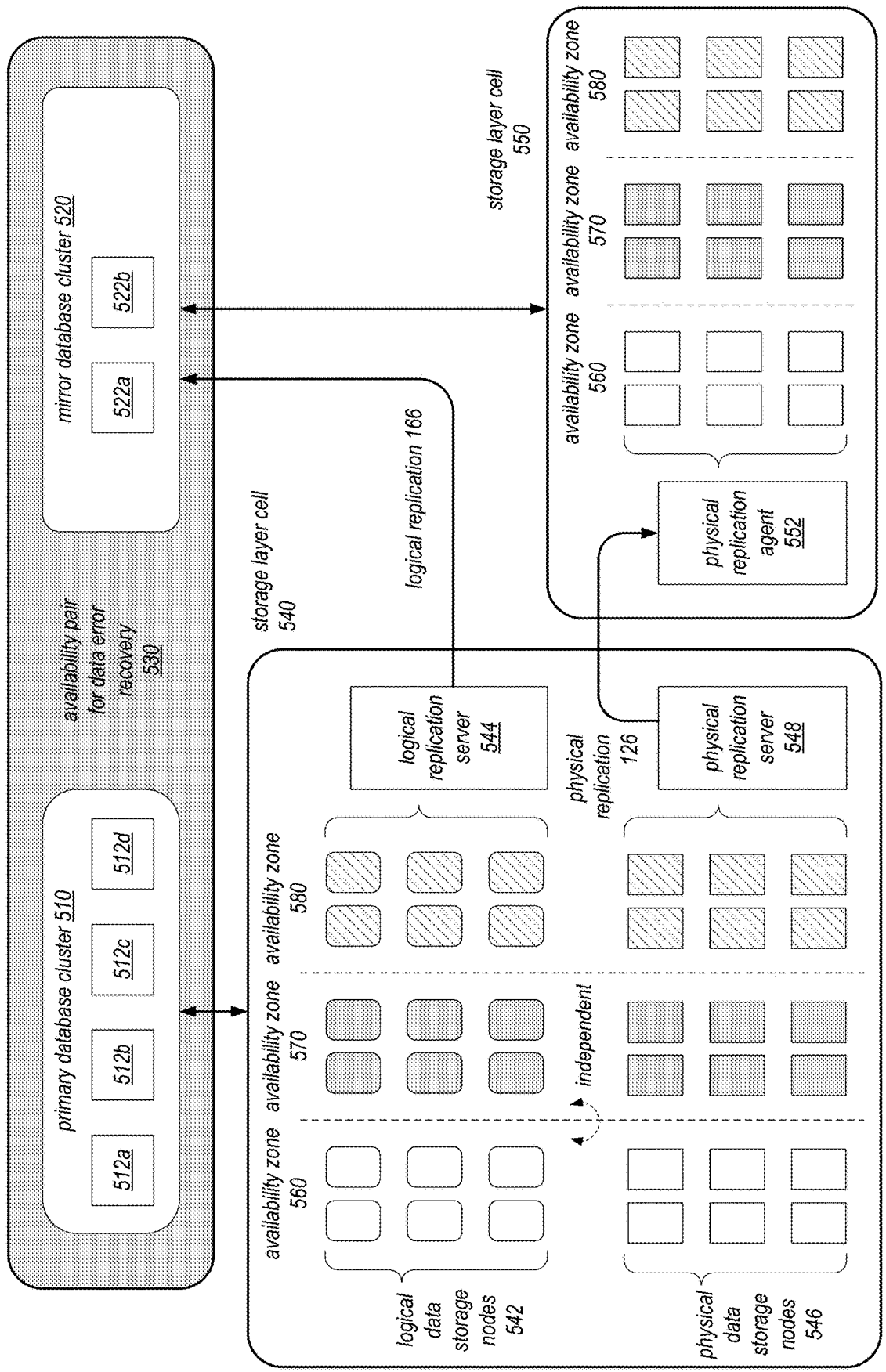
FIG. 6 illustrates example cells in a storage layer used by a database system that implements automatic recovery from detected data errors using physical and logical replication, according to some embodiments.

FIG. 6 illustrates example cells in a storage layer used by a database system that implements automatic recovery from detected data errors using physical and logical replication, according to some embodiments.

As shown in this example, the database system (e.g. database system 100 of FIG. 1) may be implemented using different groups of resources. These groups of resources may include a primary database cluster 510 (including individual database engine nodes 512a-d), a mirror database cluster 520 (including mirror database engine nodes 522a-b), a storage layer cell 540 associated with the primary database cluster (including logical and physical storage nodes 542 and 546), and a storage layer call 550 associated with the mirror database cluster 520, which includes its own set of distinct storage nodes. In some embodiments, the database engine nodes may be implemented using different instances of database engine node 310 of FIG. 3, and the storage nodes may be implemented using different instances of storage node 360 of FIG. 3.

In some embodiments, the primary database cluster 510 may implement a first instance of a database, and the mirror database cluster 520 may implement a mirror instance of the same database. In some embodiments, these two database instances may be linked to form an availability pair for data error recover. This pairing of the two instances may be configured using a configuration interfaces of the database system. In some embodiments, when a database instance is configured to enable automatic recovery from data errors, the mirror instance will be created. In some embodiments, both database clusters 510 and 520 may implement active database instances that can be used by clients to modify the database. In some embodiments, the mirror instance may be a read-only instance, or an instance that is invisible to clients.

In some embodiments, each database cluster may be associated with a group or cluster of storage nodes at the storage layer, which may be grouped into cells such as cells 540 and 550. As shown, the storage layer cell 540 for the primary database instance includes two sets of storage nodes, a set of physical data storage nodes 546 and a set of logical data storage nodes 542. These two sets may be implemented using distinct storage nodes (e.g. distinct groups of virtual machines), so that a failure or an error in one set of storage nodes is not likely accompanied by a failure or error in the other set of storage nodes. In some embodiments, the physical data storage nodes 546 may be used to implement the primary volume 120 of FIG. 1, while the logical data storage nodes 542 may be used to implement the log store 140 of FIG. 1. In some embodiments, the mirror volume 130 of FIG. 1 may be implemented using storage nodes in the storage layer cell 550.

As shown, to perform the physical and logical replication, the cells 540 and 550 may implement a set of replication servers to conduct replication communications outside of the respective cells. In some embodiments, these replication servers may be assigned as part of the cell but configured with the replication functionality. In some embodiments, these replication servers may also be virtual machines, like the storage nodes. As shown, the physical replication 126 may be implemented using a physical replication server 548 and a physical replication agent 552 residing in the destination storage cell 550. In some embodiments, the physical replication server 548 and physical replication agent 552 may be implemented using the replication agents 450a and 450b of FIG. 4. As shown, the logical replication 166 may be implemented using a logical replication server 544. In some embodiments, the logical replication server 544 may be cause logged update operations stored by the logical data storage nodes 542 to be replayed by the mirror database cluster 520. In some embodiments, the logical replication server 544 may appear to be a database client to the mirror database instance.

As shown, in some embodiments, the storage nodes in the storage layer cells 540 and 550 may be distributed across a number of availability zones 560, 570, and 580. In some embodiments, this arrangement may cause the data in each cell to be stored in a redundant manner. For example, the data of the primary volume may be separated into several segments or portions, and each segment or portion may be redundantly stored in multiple availability zones. In some embodiments, each availability zone may implement an isolated group of computing resources (e.g. servers, storage, networking equipment, power supply, etc.) that do not depend on computing resources of another availability zone. In this way, a resource failure in one availability zone will not cause a failure in a different availability zone.

As shown, in some embodiments, the logical data storage nodes 542 and the physical data storage nodes 546 may share the same availability zones. In some embodiments, the two storage layer cells 540 and 550 may also share the same set of availability zones. In this manner, the operator of the database (or database system) do not have to implement a large number of availability zones. The database system may be protected from equipment failure by through the use of multiple availability zones, and from data errors from the use of separate storage for physical data, logical data, and the mirror volume. In some embodiments, the two storage layer cells 540 and 550 may be implemented in a same geographic location. Having the two storage layer cells in close proximity allows the mirror volume to mirror primary volume more quickly and easily. In other embodiments, the two storage layer cells may be implemented using over different availability zones, or in different geographic locations.

Figure 7:
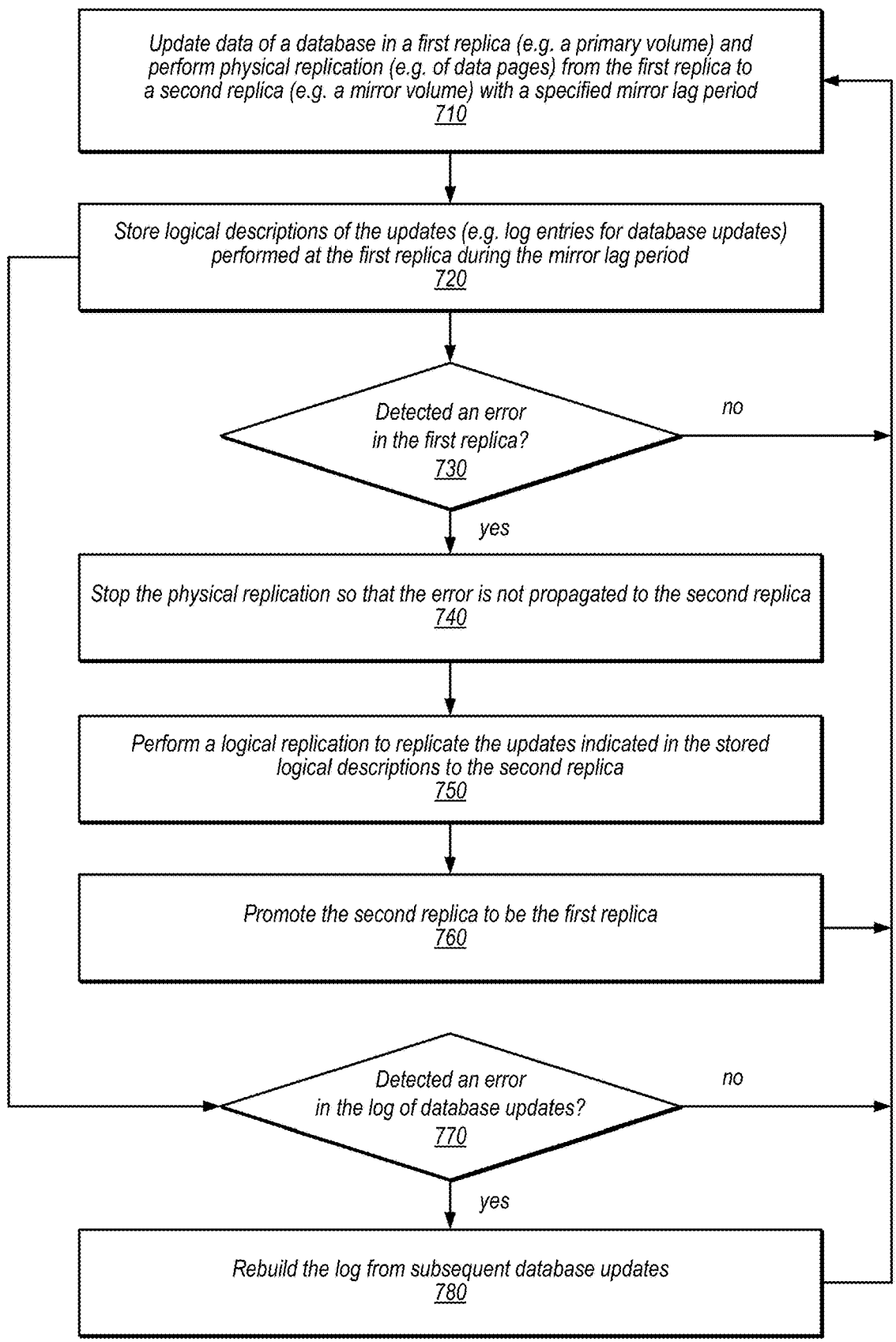
FIG. 7 is a flowchart illustrating an example process of automatic recovery from detected data errors using physical and logical replication, according to some embodiments.

FIG. 7 is a flowchart illustrating an example process of automatic recovery from detected data errors using physical and logical replication, according to some embodiments. In some embodiments, the depicted process may be performed by the database system 100 of FIG. 1.

The process begins at operation 710, where data of a database is updated. The data may be updated in a first replica, for example, the primary volume 120 of FIG. 1. The updated data may be replicated via a physical replication to a second replica, for example, mirror volume 130 of FIG. 1. In some embodiments, the physical replication may involve copying modified pages or blocks from the primary volume to the mirror volume. The physical replication process may be performed via the physical replicator 124 of FIG. 1 or replication agents 450a and 450b of FIG. 4. In some embodiments, the physical replication may be configured with a specified mirror lag period, so that the state of the mirror volume will lag behind the state of the primary volume. The mirror lag is implemented to give the database system to stop the physical replication in time to avoid propagating data errors in the primary volume to the mirror volume. Depending on the embodiment, the mirror lag may be specified in terms of time, number of updates, or in a different manner.

At operation 702, logical descriptions of the updates to the first replica are stored. In some embodiments, these logical descriptions may be log entries for database updates or page updates. In some embodiments, the log entries may be limited to those updates that were last performed in the mirror lag period. In some embodiments, logged updates may be kept for a longer period, and only a subset of the logged updates will be selected for the logical replication process. In some embodiments, this logical data (e.g. logical data 142) will be stored in a separate log store 140, which is distinct from the primary volume that is used to store the physical data.

At operation 730, a determination is made whether an error is detected in the first replica. The error may be, for example, a data error in a page or block in the first replica or primary volume. In some embodiments, this detection may be made within the mirror lag period of the physical replication process. In some embodiments, the detection may be performed at the database engine node by comparing two different versions of a page or block to determine if the version in the storage layer is incorrect. If there is no data error detected, the process loops back to operation 710 to continue with normal database updates. If there is a data error detected, the process proceeds to operation 740.

Operations 740, 750, and 760 may be performed together as a recovery process in response to the detected error. At operation 740, the physical replication process to the mirror volume or second replica is stopped. This stoppage is performed in time so that the data error in the primary volume or first replica is not propagated to the mirror volume or second replica. The delta of updates between the two volumes or replicas will be made up using the logical data.

At operation 750, a logical replication process is performed to replicate the updates indicated in the stored logical descriptions to the second replica. In some embodiments, this logical replication may be performed by the logical replicator 144 of FIG. 1. In some embodiments, the logical replicator may cause another database engine to replay logged update operations on the mirror volume. By replaying the updates from the logged updates, the data error detected in the primary volume may be avoided. Because the update operations to be replayed are limited to only those in the mirror lag period, this operation may be completed relatively quickly, for example, in a matter of seconds.

At operation 760, once the logical replication process is completed, the second replica or mirror volume will be promoted to become the new first replica. Thus, all subsequent updates to the database will be performed directly on the new first replica. In some embodiments, the recovery process will cause no data loss, so that all client requests received prior to the recovery process are reflected by the new first replica. In some embodiments, after the recovery process, a new mirror volume will be automatically created to mirror the new primary volume.

At operation 770, a different determination is made whether an error is detected in the log database updates (e.g., the logical descriptions of the updates). If so, the process proceeds to operation 780. At operation 780, the log is rebuilt from subsequent database updates. In this case, because there has been no error in the primary volume, the log data may be fixed in the background in a manner that is completely transparent to clients of the database. Moreover, because the mirror lag period may be short, the log may be rebuilt in fairly quick order.

Figure 8:
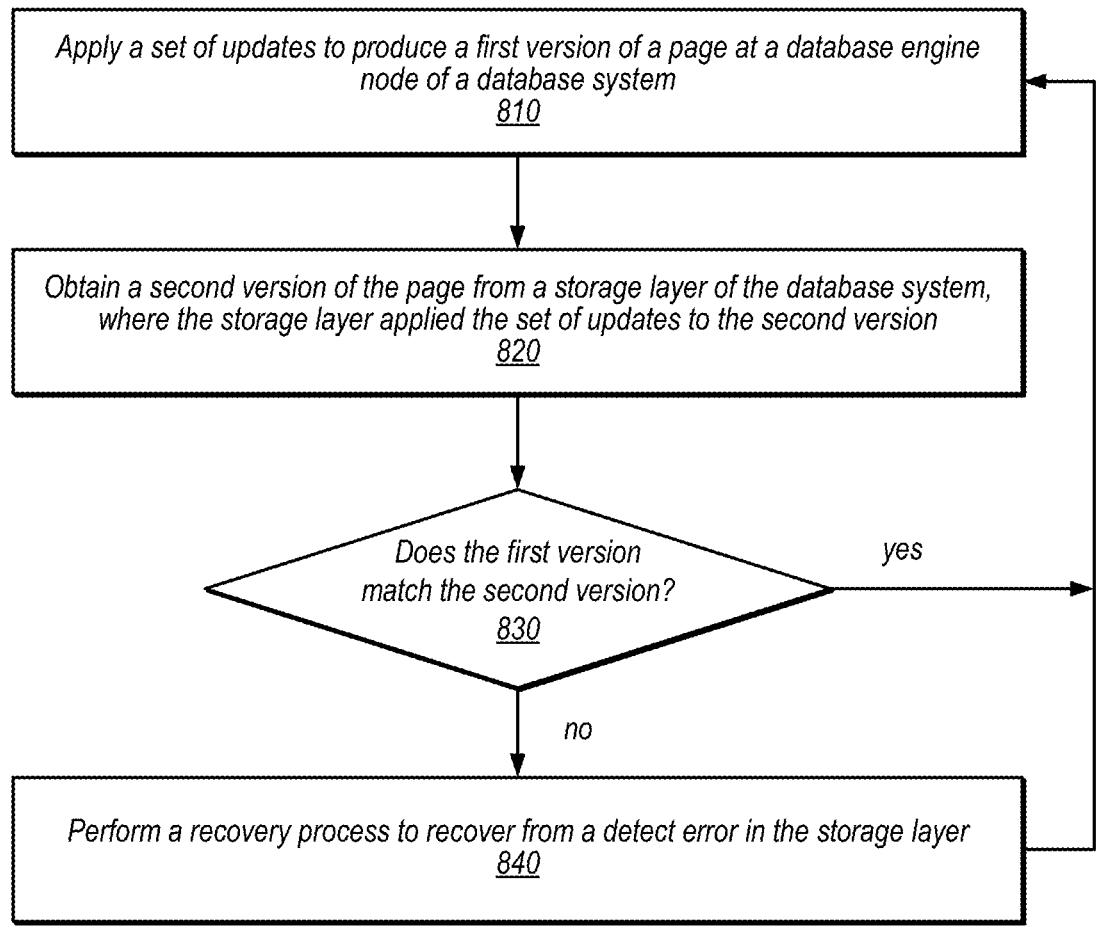
FIG. 8 is a flowchart illustrating example process of detecting data errors in the storage system, according to some embodiments.

FIG. 8 is a flowchart illustrating example process of detecting data errors in the storage system, according to some embodiments. In some embodiments, the depicted process may be performed by the database system 100 of FIG. 1.

At operation 810, a set of updates is applied to a page of a database to produce a first version of the page. This operation may be performed at the database engine node, as discussed in connection with FIG. 5. In some embodiments, the first version of the page may be a page image produced in an in-memory cache of the database engine node.

At operation 820, a second version of the page is obtained from the storage layer of the database system. The second version may be a second page image produced by the storage layer, by applying the same set of updates that were used to produce the first page image at the database engine node. In some embodiments, the storage layer may be forced to produce this second page image within a specified period of time, for example, within the mirror lag period of the physical replication process. In some embodiments, the error detection may be performed by the database engine node, which is able to obtain the second page image from the storage layer. In other embodiments, the error detection may be performed by the storage layer, or a different component of the database system.

At operation 830, two first version of the page is compared to the second version of the page to determine if the two versions match. In some embodiments, this comparison may be made by computing respective hash values or checksum values for the two pages using a same function, and then comparing the two values. If the two values are a match, the two pages may be deemed to match, and the process proceeds back to operation 810. If the two values do not match, the detection process may determine that there has been a data error. In that case, the process proceeds to operation 840.

At operation 840, a recovery process is performed to recover from the detected data error. This process may be performed as described in connection with operations 740, 750, and 760 of FIG. 7. As discussed, the recovery process may involve replaying certain updates to a mirror volume, and promoting the mirror volume to replace the primary volume, which contains the data error. In some embodiments, the recovery process may be performed for any page update with detected data errors to automatically recover from all detected data errors in the database.

Figure 9:
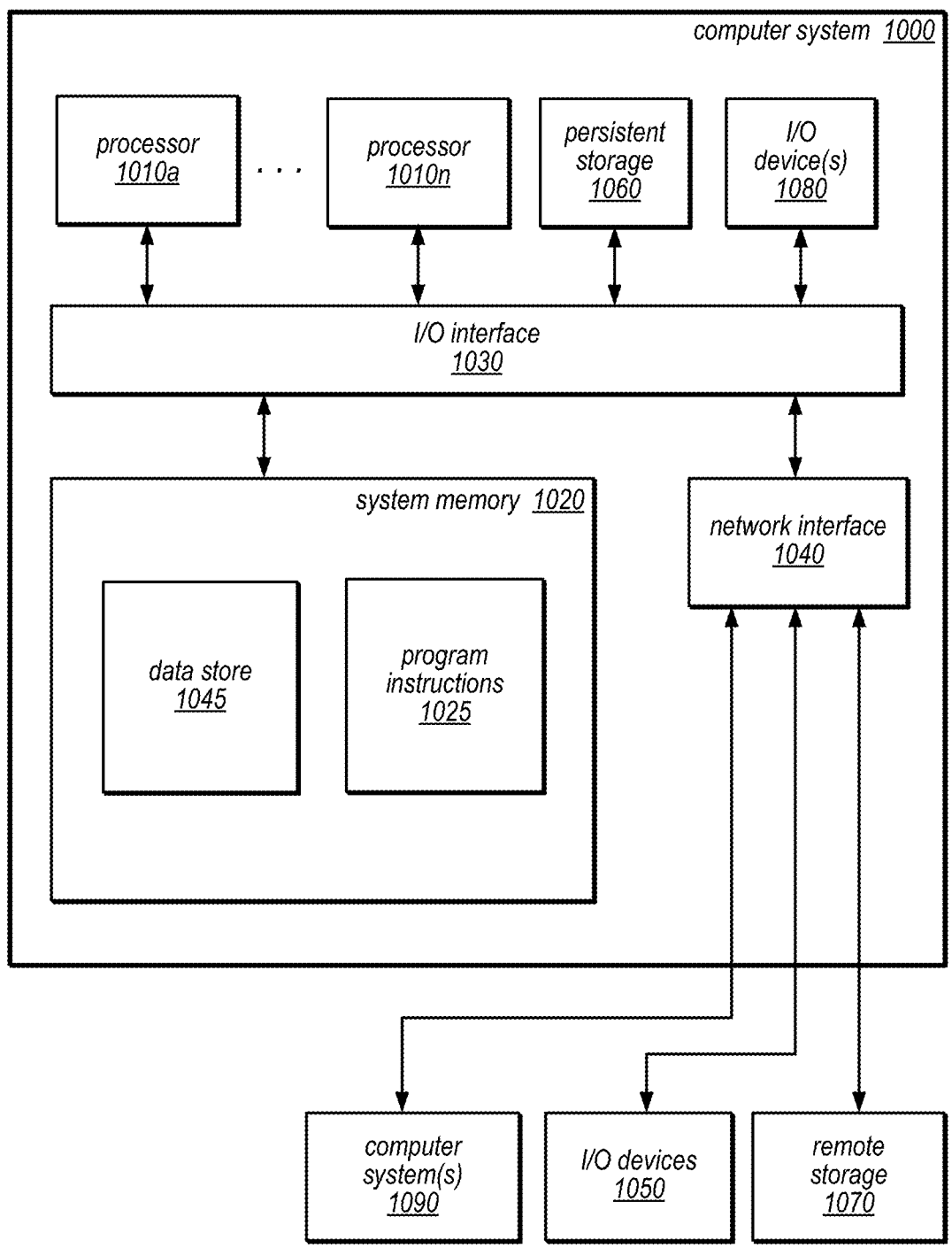
FIG. 9 is a block diagram illustrating an example computer system that can be used to implement one or more portions of a database system that implements automatic recovery from detected data errors using physical and logical replication, according to some embodiments.

FIG. 9 is a block diagram illustrating an example computer system that can be used to implement one or more portions of a database system that implements automatic recovery from detected data errors using physical and logical replication, according to some embodiments. For example, computer system 1000 may implement a read-write (or master/leader/primary) node of a database tier, a read-only node (or read replica/secondary node), replication agents, or one of a plurality of storage nodes of a separate distributed storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be generalpurpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more hardware processors with associated memory that implement a database system, configured to:
perform physical replication of updates performed at a primary volume of the database to a mirror volume of the database that causes the mirror volume to lag the primary volume according to a period of time;
separate from the primary volume, store respective logical descriptions of the updates performed at the primary volume within the period of time;
responsive to detecting a data error of incorrect data in the primary volume caused by one or more of the updates performed at the primary volume:
stop the physical replication so that the data error is not propagated to the mirror volume;
perform a logical replication to replicate one or more of the updates to the mirror volume using the respective logical descriptions of the updates; and
promote the mirror volume to be a new primary volume of the database.

2. The system of claim 1, wherein:
the stopping of the physical replication, performing of the logical replication, and the promoting of the mirror volume are performed as part of a failover process to the mirror volume; and
the failover process is performed with no loss of client requests for the database received prior to the failover process.

3. The system of claim 1, wherein:
the database system is implemented as a database service provided by a service provider network;
the database service is implemented using one or more database engine nodes configured to issue write operations to the primary volume, wherein the primary volume is provided by a storage service; and
the storage service is implemented using a plurality of storage nodes configured to provide redundant storage for the primary volume.

4. The system of claim 3, wherein:
the primary volume is stored using a first set of storage nodes, and the logical descriptions of the updates are stored using a second set of storage nodes distinct from the first set.

5. The system of claim 1, wherein the primary volume and the mirror volume are located at a same geographic location.

6. A method, comprising:
performing, by one or more hardware processors with associated memory that implement a database system:
   causing a delay when replicating updates performed at a first replica of a data set to a second replica of the data set for a period of time;
   separate from performing the updates at the first replica, storing one or more indications that describe the updates performed at the first replica within the period of time;
   responsive to detecting a data error of incorrect data in the first replica caused by one or more of the updates performed at the first replica:
      stopping replication so that the data error is not propagated to the second replica;
      replicating one or more of the updates to the second replica, including the one update, using at least one of the one or more of the indications that describe the updates.

7. The method of claim 6, wherein:
the stopping of the replication and the replicating of the one or more updates to the second replica are performed as part of a failover process from the first replica to the second replica; and
the failover process is performed with no loss of client requests for the data set received prior to the failover process.

8. The method of claim 7, further comprising:
continuing to accept client requests to the data set during the failover process.

9. The method of claim 6, wherein the database system is implemented as a database service provided by a service provider network, and further comprising performing, by the database service:
   providing one or more database engine nodes for the data set configured to issue write operations to the first replica, wherein the first replica is provided by a storage service; and
   providing a plurality of storage nodes in the storage service configured to provide redundant storage for the first replica.

10. The method of claim 9, further comprising:
providing a set of storage nodes in the storage service for storing the one or more indications that describe the updates performed at the first replica, wherein the set of storage nodes is distinct from the storage nodes used to provide the first replica.

11. The method of claim 9, wherein:
providing the storage nodes for the first replica comprises providing storage nodes from multiple availability zones, wherein resources in the plurality of availability zones are isolated so that a resource failure in one availability zone does not cause a failure of another availability zone; and
further comprising, providing different storage nodes for the second replica in the multiple availability zones.

12. The method of claim 9, wherein:
the detecting of the data error at the first replica comprises:
   detecting a mismatch between a first version of a page and a second version of the page, wherein the first version is produced by a database engine node of the database service, and the second version is produced by the storage service.

13. The method of claim 6, wherein:
storing the one or more indications that describe the updates performed at the first replica comprises storing the one or more indications in an update log of the data set.

14. The method of claim 13, further comprising:
responsive to a detection a second data error in the update log, rebuilding the update log from subsequent updates to the data set.

15. The method of claim 6, further comprising:
receiving, via a configuration interface of the database system, configuration input indicating to enable automatic recovery of the first replica upon detecting one or more data errors in the first replica; and
creating the second replica in response to the configuration input.

16. The method of claim 6, further comprising:
receiving, via a configuration interface of the database system, configuration input to configure one or more parameters of an automatic recovery of the first replica upon detecting one or more data errors in the first replica, wherein the configuration input specifies the period of time as a mirror lag for the second replica.

17. The method of claim 6, wherein:
the first and second replicas are stored in respective disks of a redundant array of inexpensive disks (RAID) storage system; and
the detecting of the data error in the first replica is performed by a controller of the RAID storage system.

18. One or more non-transitory computer-accessible storage media storing program instructions that when executed on or across one or more processors implement at least portion of a database system, wherein:
the database system is configured to:
   cause a delay when replicating updates performed at a first replica of a data set to a second replica of the data set for a period of time;
   separate from performing the updates at the first replica, store one or more indications that describe the updates performed at the first replica within the period of time;
the program instructions when executed on the one or more processors cause the database system to;
   detect a data error of incorrect data in the first replica caused by one or more of the updates performed at the first replica, and in response:
      stop replication so that the data error is not propagated to the second replica; and
      replicate one or more of the updates to the second replica, including the one update, using at least one of the one or more of the indications that describe the updates.

19. The one or more non-transitory computer-accessible storage media of claim 18, wherein the program instructions when executed on or across the one or more processors cause the database system to:
perform the stopping of the replication and the replicating of the one or more updates to the second replica are performed as part of a failover process from the first replica to the second replica; and
wherein the failover process is performed with no loss of client requests for the data set received prior to the failover process.

20. The one or more non-transitory computer-accessible storage media of claim 19, wherein the program instructions when executed on or across the one or more processors cause the database system to:

continue to accept client requests to the data set during the failover process.

* * * * *